US010473223B2

(12) United States Patent
Wech

(10) Patent No.: US 10,473,223 B2
(45) Date of Patent: Nov. 12, 2019

(54) EVACUATION VALVE

(71) Applicant: Oil-Rite Corporation, Manitowoc, WI (US)

(72) Inventor: Michael J. Wech, Manitowoc, WI (US)

(73) Assignee: Oil-Rite Corporation, Manitowoc, WI (US)

( * ) Notice: Subject to any disclaimer, the term of this patent is extended or adjusted under 35 U.S.C. 154(b) by 13 days.

(21) Appl. No.: 15/447,884

(22) Filed: Mar. 2, 2017

(65) Prior Publication Data
US 2018/0252321 A1 Sep. 6, 2018

(51) Int. Cl.
*F16K 1/36* (2006.01)
*F16K 1/46* (2006.01)

(52) U.S. Cl.
CPC . *F16K 1/46* (2013.01); *F16K 1/36* (2013.01)

(58) Field of Classification Search
CPC ..................................... F16K 1/36; F16K 1/46
USPC .................................................. 251/318–334
See application file for complete search history.

(56) References Cited

U.S. PATENT DOCUMENTS

| 600,841 | A | | 3/1898 | Oderman |
| 603,242 | A | | 4/1898 | Weatherhead |
| 663,607 | A | * | 12/1900 | Lynch ...................... F16K 1/46 |
| | | | | 251/357 |
| 990,616 | A | | 4/1911 | Whitaker et al. |
| 1,108,984 | A | | 9/1914 | Frey |
| 2,175,881 | A | | 10/1939 | Davis |
| 2,351,930 | A | | 6/1944 | Davis |
| 2,392,030 | A | | 1/1946 | Davis |
| 2,457,339 | A | | 12/1948 | Bertea |
| 2,550,535 | A | | 4/1951 | Davis |
| 2,605,021 | A | | 7/1952 | Churchill et al. |
| 2,818,029 | A | | 12/1957 | Petzold |
| 2,931,313 | A | | 4/1960 | Hughes |
| 3,306,231 | A | | 2/1967 | Cadiou |
| 3,929,042 | A | * | 12/1975 | Blocker ................. B25B 13/48 |
| | | | | 7/138 |
| 3,930,756 | A | | 1/1976 | Bruggeman |
| 3,947,942 | A | * | 4/1976 | Blocker ................. B25B 13/48 |
| | | | | 137/15.17 |
| 4,062,424 | A | | 12/1977 | Lyden |
| 4,106,525 | A | | 8/1978 | Currie et al. |
| 4,119,295 | A | * | 10/1978 | Blocker ................. F16K 1/303 |
| | | | | 251/144 |
| 4,436,494 | A | | 3/1984 | Yamaizumi |
| 4,577,728 | A | | 3/1986 | Gruett |
| 4,739,612 | A | | 4/1988 | Stockbridge |
| 4,784,578 | A | | 11/1988 | Gruett |
| 4,784,584 | A | | 11/1988 | Gruett |
| 5,435,130 | A | | 7/1995 | Kroiss et al. |

(Continued)

FOREIGN PATENT DOCUMENTS

| DE | 1247788 B | * | 8/1967 | ............... F16K 1/46 |
| DE | 102012211575 | * | 1/2014 | ............... F16K 1/46 |

(Continued)

*Primary Examiner* — Marina A Tietjen
(74) *Attorney, Agent, or Firm* — Ryan Kromholz & Manion, S.C.

(57) ABSTRACT

An evacuation valve for a metering device or pump for a liquid medium is disclosed. The valve includes a seal holder having an annular groove formed therein and an O-ring seal. The O-ring seal is positioned within the annular groove and provides an evacuation valve seal surface.

7 Claims, 4 Drawing Sheets

(56) References Cited

U.S. PATENT DOCUMENTS

| | | | | |
|---|---|---|---|---|
| 5,984,652 A | * | 11/1999 | Gruett | F04B 53/121 |
| | | | | 417/553 |
| 7,118,352 B2 | | 10/2006 | Gruett et al. | |
| 8,157,243 B2 | | 4/2012 | Wech | |
| 2004/0221894 A1 | * | 11/2004 | Henley | G05D 16/103 |
| | | | | 137/505.25 |
| 2009/0071553 A1 | * | 3/2009 | Wech | B29C 45/14344 |
| | | | | 137/528 |
| 2016/0201809 A1 | * | 7/2016 | Varga | F16K 1/36 |
| | | | | 251/84 |

FOREIGN PATENT DOCUMENTS

| | | | | | |
|---|---|---|---|---|---|
| GB | 1104639 A | * | 2/1968 | | F16K 1/46 |
| GB | 1210814 A | * | 11/1970 | | F16K 1/46 |
| GB | 1447725 A | * | 8/1976 | | F16K 1/46 |
| WO | WO 2015025161 A2 | * | 2/2015 | | F16K 1/36 |

* cited by examiner

EVACUATION VALVE

BACKGROUND OF THE INVENTION

This invention relates generally to metering devices for the precision feeding of a liquid medium, even in relatively small or minute quantities. Specifically, the invention relates to the construction of the evacuation valve for such metering devices.

Petroleum-based and synthetic lubricants, such as oil, are among the many liquids that are at times metered to machinery. In a given instance, the feeding of too little oil may place a machine at risk for excessive wear, damage or even catastrophic failure. However, too much oil may contaminate the product being manufactured and/or contribute to pollution and waste. Thus, accuracy in the metering of lubricants can be very important.

One such metering device is commercially known as the PurgeX® injector pump. The present invention comprises an improvement in such metering devices, including those described and claimed in U.S. Pat. Nos. 4,784,578, 4,784,584 and 7,118,352, each incorporated herein by reference.

These metering devices include an evacuation valve. The evacuation valve typically consists of a machined seal holder, or seal carrier, and a seal adhered or molded within the confines of an open chamber of the seal carrier. A portion of the seal protrudes from the seal holder to provide a critical sealing surface. In the past, one embodiment of the seal has been cut from sheet stock material and then affixed to the seal holder with adhesive. This construction has many drawbacks.

The primary drawback has been the inconsistency of the surface finish on the sheet material. Sheet material is likely to come from different suppliers and be handled in different manners during transport. If the surface finish is too rough, a poor seal will be provided by the evacuation valve. Furthermore, during the cutting process, great care must be taken to insure that the resulting cut seal is flat and that the seal edges are unobstructed and substantially perpendicular to the seal surface. If the edges are tapered, concave or convex, the seal is likely to function poorly. In other instances, the resulting cut seal has a skewed or trapezoidal shape when viewed from the front. Such shaped seals again perform poorly. The cutting process often generates debris that must be removed before the gluing process. In addition, the seal must be further cleaned to remove any oils or other contaminates, again prior to the gluing process. The selected adhesive used to join the seal with the seal holder must be compatible with the lubricant or fluid that will be dispensed through the metering device. Selecting an incompatible adhesive will ultimately lead to valve failure.

During the gluing process, great care must be taken again to insure that none of the glue is dispensed upon or makes contact with the seal surface. Further, it is important to insure that the seal is properly positioned and centered within the seal holder, or carrier. As can be appreciated, the entire process is quite labor intensive and requires multiple inspections of the parts prior to and during assembly.

Another design has an open cavity formed in the seal carrier. The seal carrier is placed in a mold having another open portion adjacent to the cavity. Liquefied seal material, typically an elastomeric material is then injected through the carrier and into the mold thereby forming the seal within the space defined by the open cavity and the open mold portion. The seal includes a smooth, flat sealing surface located above the seal carrier formed by the open space. When the mold halves are separated, a finished evacuation valve 20 is removed from the mold.

This design also has drawbacks. For example, during the molding removal process the rubber seal material can pull out of the holder resulting in a seal that is not flat. A molded seal having a concave or convex seal surface can lead to a potentially leaking evacuation valve. Due to the formation of a hex broach within the mold cavity of the seal carrier to prevent rotation, once the molded seal became partially dislodged from the carrier, it cannot simply be pushed back in. During the molding process, there is a potential for excess seal material to form flash on the top surface of the carrier. If not removed, the flash material is likely to come loose during operation of the evacuation valve and thus prevent proper sealing. To prevent this situation, any flash material must be removed from the evacuation valve after molding and before installation in the metering device. Again, the entire process is quite labor intensive and requires multiple inspections of the parts prior to and during assembly.

The present invention overcomes these shortcomings by providing an evacuation valve that utilizes an O-ring. As described herein, the resulting valve is more economical to produce, has a superior sealing surface, and will provide a longer service life.

SUMMARY OF THE INVENTION

The invention resides in a metering device for a liquid medium which comprises a housing having an inlet and an outlet for the liquid medium. A cylinder is disposed in a housing. The housing has an open end that communicates with a housing outlet. An evacuation valve is provided in the housing and is biased (typically by a spring) to close the open end of the cylinder. A piston is operatively disposed in the cylinder and forms therewith a metering chamber ahead of the piston. Means are provided to conduct the liquid medium from the inlet to the metering chamber. Means are further provided to drive the piston forwardly through a working stroke thereby forcing the liquid medium in the metering chamber out of the chamber and past the evacuation valve toward the housing outlet. The piston breaks the plane of the open end of the cylinder on each working stroke to generally preclude entrapment of air in the metering chamber and thus provide for more accurate metering of the liquid medium, even in minute quantities.

The improved evacuation valve of the present invention includes two primary components, a seal holder, or carrier, and a seal in the form of an O-ring seated within an annular cavity formed in the carrier. The O-ring seal has a portion thereof extending beyond the seal carrier. The seal holder or carrier is formed from a strong, durable material such a metal or plastic. The O-ring seal is formed from a softer, pliable material such as rubber. The portion of the O-ring seal that extends beyond the seal holder forms a critical seal surface.

The seal holder (or carrier) includes a body having an outer periphery and an annular groove. The outer periphery of the carrier fits within the lower end of the valve housing as described above. The annular groove is formed with side walls that are substantially parallel to the outer periphery. The annular groove bottom wall has a height that is slightly less than the height of the O-ring.

In a preferred embodiment, the diameter of the inner annular groove side wall is slightly greater than the inner diameter of the O-ring while the diameter of the outer annular groove side wall is substantially the same as the outer diameter of the O-ring.

DESCRIPTION OF THE PREFERRED EMBODIMENT

Although the disclosure hereof is detailed and exact to enable those skilled in the art to practice the invention, the physical embodiments herein disclosed merely exemplify the invention that may be embodied in other specific structure. While the preferred embodiment has been described, the details may be changed without departing from the invention which is defined by the claims.

Figure 1:
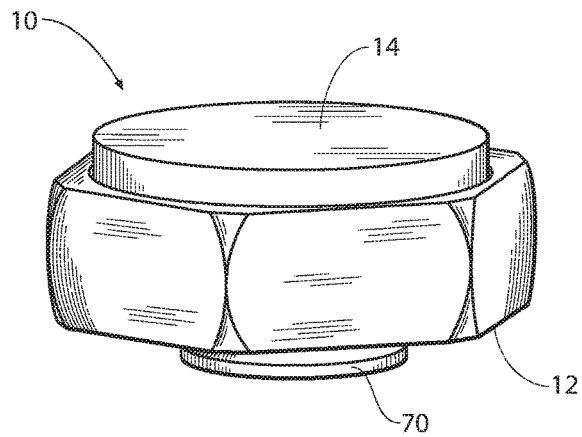
FIG. 1 is a perspective view of a prior art evacuation valve.
Figure 2:
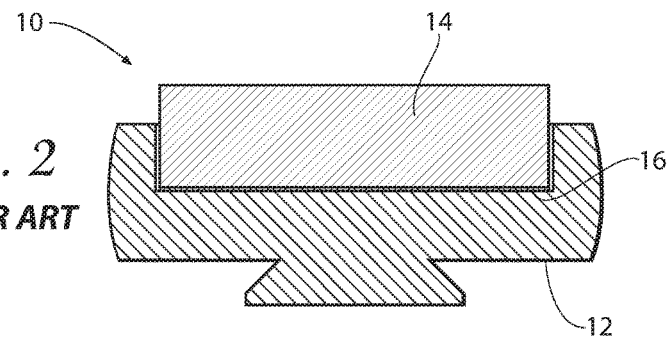
FIG. 2 is cross-sectional view of the prior art evacuation valve shown in FIG. 1.
Figure 3:
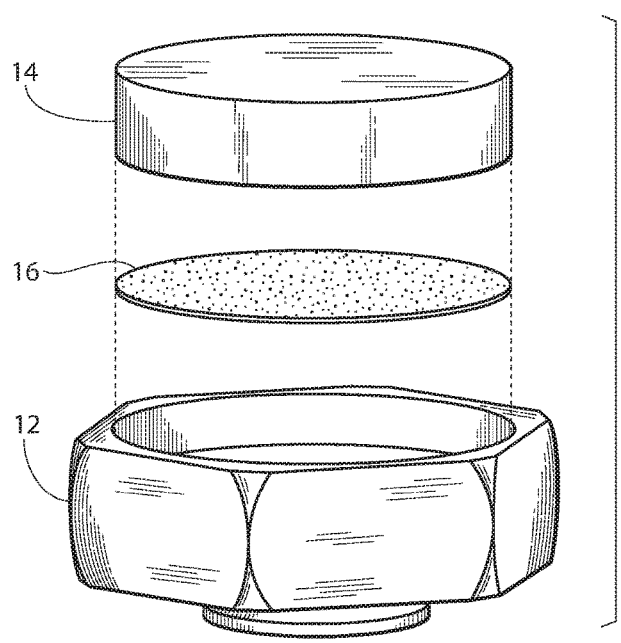
FIG. 3 is an exploded perspective view of the prior art evacuation valve shown in FIG. 1.
Figure 4:
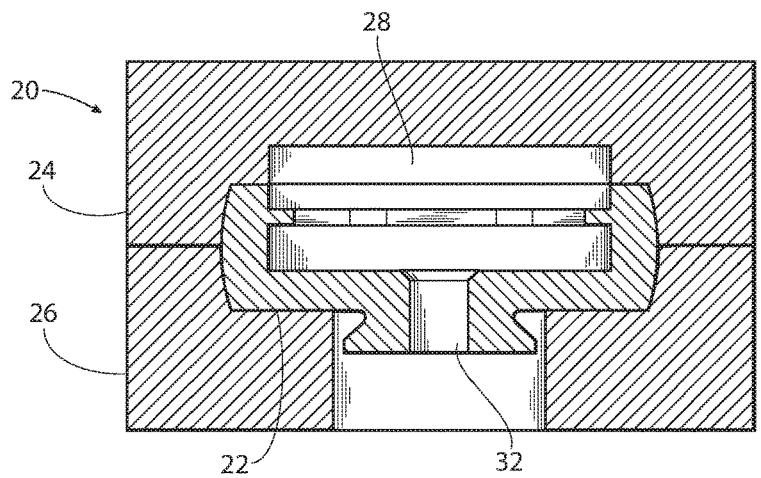
FIG. 4 is a cross sectional view of another prior art seal holder placed within a mold.

Referring to the drawings, wherein like numerals represent like parts throughout the views, prior art designs are shown in FIGS. 1 through 7. A pertinent prior art evacuation valve 10, as shown in FIGS. 1-3, includes a seal holder, or carrier 12 and a seal 14. In this prior art design, the seal 14 is cut from sheet stock material. This is accomplished by any of a variety of operations such as punching, die cutting or circular cutting. As shown in FIGS. 2 and 3, the cut seal 14 is then affixed to the seal holder 12 with an adhesive 16. The resulting evacuation valve 10 is shown in FIG. 1.

Figure 5:
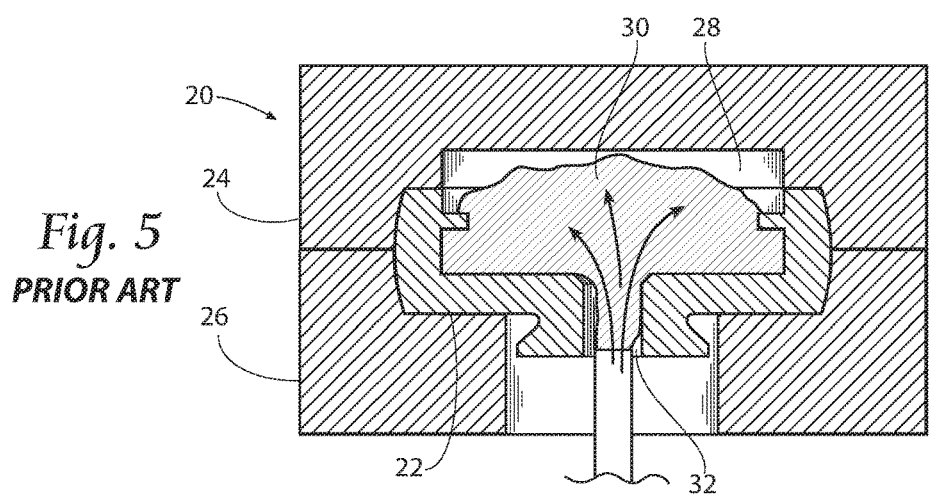
FIG. 5 is a cross sectional view of the rubber material flowing through the prior art seal holder and into the mold.
Figure 6:
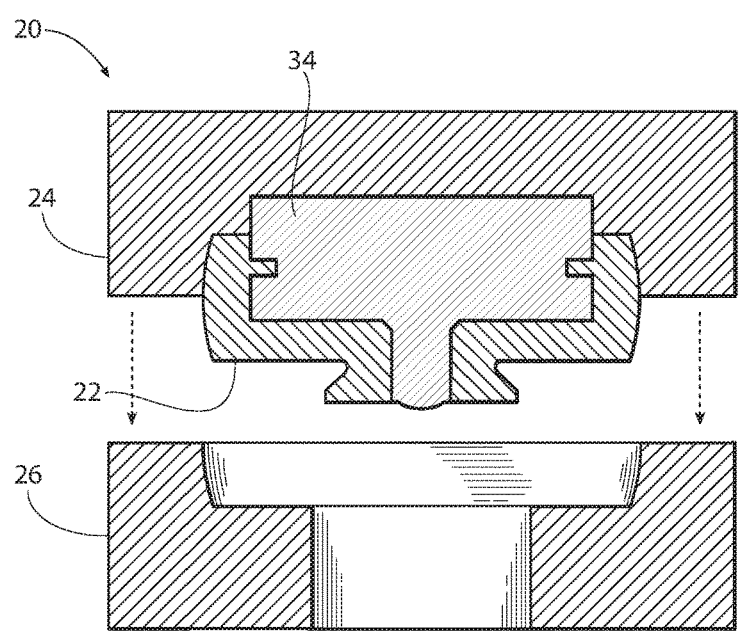
FIG. 6 is a cross sectional view of the prior art evacuation valve just prior to its removal from the mold.
Figure 7:
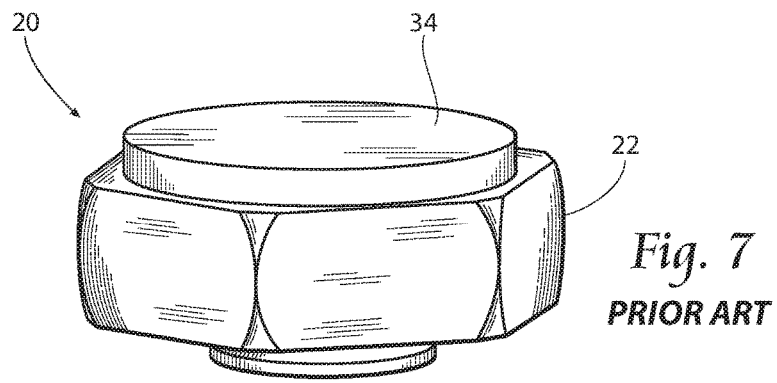
FIG. 7 is a perspective view of the prior art evacuation valve after its formation as shown in FIG. 4-6.
Figure 8:
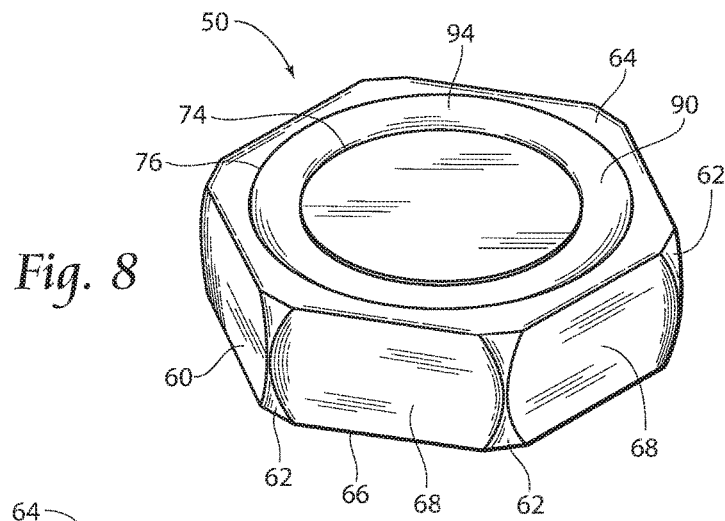
FIG. 8 is a perspective view of the evacuation valve of the present invention.
Figure 9:
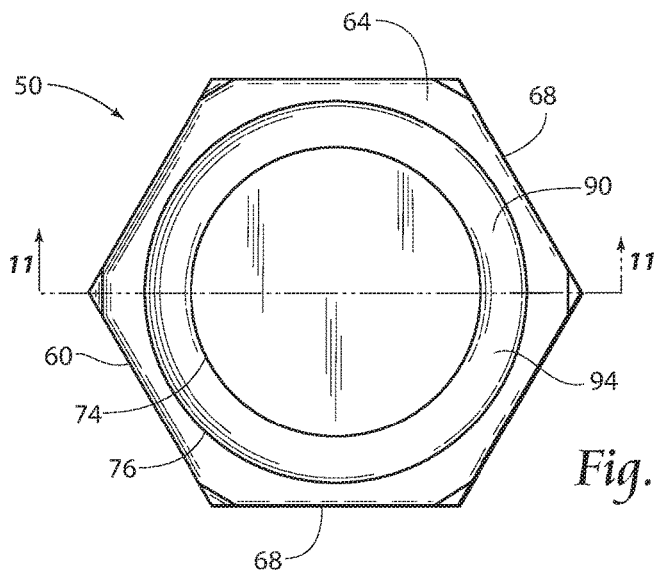
FIG. 9 is a top plan view thereof.
Figure 10:
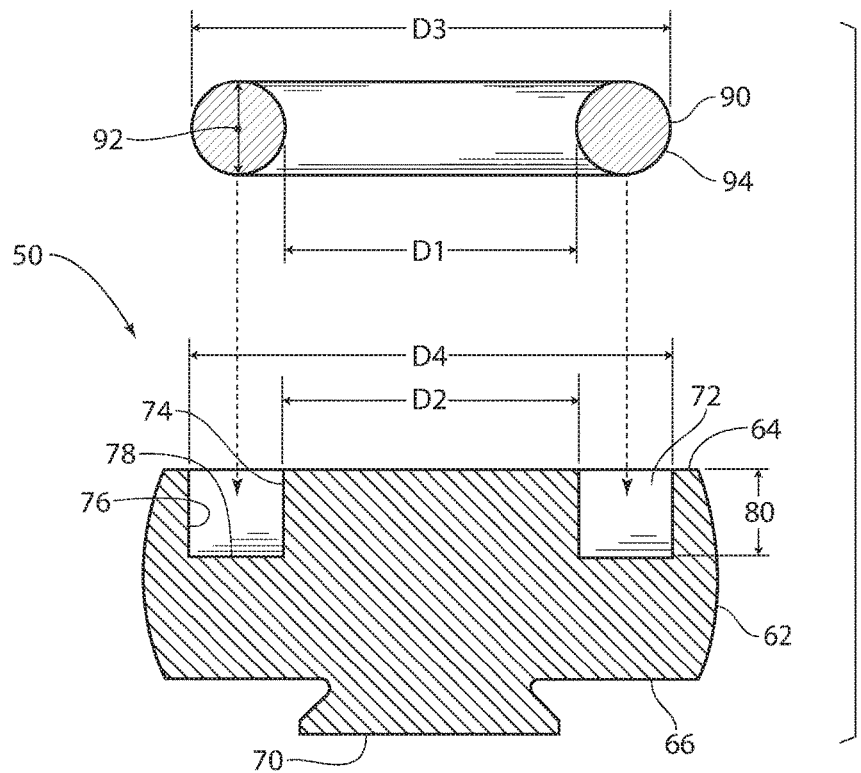
FIG. 10 is a cross-sectional exploded view of the improved evacuation seal of the present invention.

Another pertinent prior art evacuation valve 20 is shown in FIGS. 4-7. In this design, the seal holder or carrier 22 is placed between mating mold halves 24 and 26. When closed, mold halves 24 and 26 form an internal cavity 28 within and above the carrier 22. As shown in FIG. 5, liquid seal material 30 is injected through opening 32 in the bottom of carrier 22 and into the internal cavity 28. Once the material 30 has solidified, the mold halves 24, 26 are separated as shown in FIG. 6 and the carrier 22 with a solidified seal 34 is removed. The resulting prior art evacuation seal 20 is shown in FIG. 7.

The present invention, as depicted in FIGS. 8-11, features an improved evacuation valve and will be referred to by reference numeral 50. The improved evacuation valve 50 includes a seal holder, or carrier 60 having a seal in the form of an O-ring 90 seated therein.

The seal holder 60 is preferably formed from brass; however it is to be understood that it could be formed from any sufficiently stiff and rigid material including either metals or plastics. In the preferred embodiment, the seal holder 60 is preferably formed from ⅜ inch hex bar stock. Alternatively, the seal holder could be formed from 10 millimeter hex bar stock or any other suitable size. The conventional bar stock is first turned in a lathe. This process is intended to "break" or round the corners 62 of the hex bar stock material. This prevents the binding of the seal holder 60 if it should become out of axial alignment with a cylindrical bore, such as the evacuation valve bore (not shown). The resulting body 60 has a first topside 64, a second underside 66 and side walls 68. While the seal holder 60 is shown to be hexagonal in shape, it is to be understood that it could have any geometric shape. A spring retaining structure 70, substantially identical to that of the prior art design, is formed on underside 66 of the seal holder, or carrier 60. As best shown in the cross sectional views of FIGS. 10 and 11, an annular groove 72 is formed on the first surface 64. The groove 72 has an inner annular groove wall 74, an outer annular groove wall 76 and a bottom wall 78. The annular groove 72 has an inner diameter D2 and an outer diameter D4. Annular groove 72 also has a groove depth 80.

Figure 11:
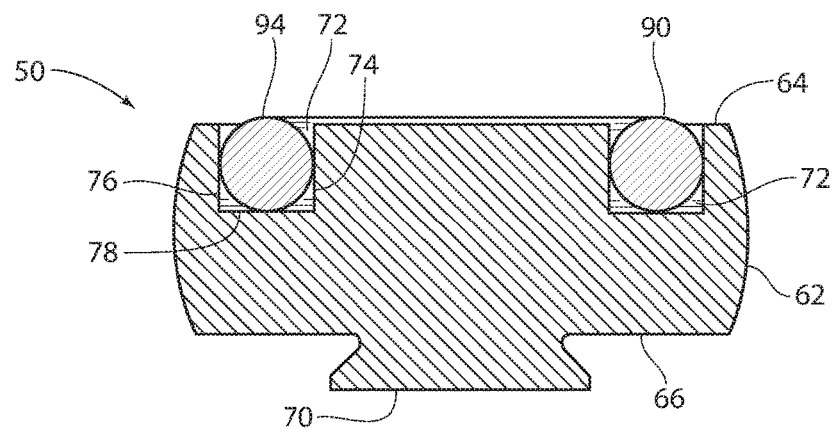
FIG. 11 is a cross-sectional view of the improved evacuation seal of the present invention taken along line 11-11 in FIG. 9.

An O-ring 90 is provided to fit in the annular groove 72. The O-ring 90 has a height 92. The depth 80 of annual groove 72 is less than O-ring height 92. This ensures that a portion of the O-ring 90 protrudes past upper surface 64 of carrier 60 as shown in FIG. 11. The O-ring also has an inner diameter D1 and an outer diameter D3. In a preferred embodiment, inner diameter D1 is slightly less than annular groove inner diameter D2 and outer diameter D3 is substantially equivalent to annular groove outer diameter D4.

Unlike the prior art described above, the O-ring seal 90 is simply placed in the annular groove 72 without the need for adhesive or a specialized molding process. In the preferred embodiment where the inner diameter D1 of the O-ring seal 90 is slightly smaller than the inner diameter D2 of the annular groove 72, the installer will be required to stretch the O-ring seal 90 a small amount as it is placed about the inner diameter D2 of the annular groove 72 of the carrier or holder 60. Even if the diameter D1 of the O-ring seal 90 is substantially the same or slightly larger than the inner diameter D2 of the annular groove 72, the seal 90 will remain in place due to the construction of the evacuation valve (not shown). When the valve is closed, the valve spring holds the O-ring seal 90 in place. When the valve is pumping, the fluid being pumped holds the O-ring seal 90 in place.

The installed O-ring seal 90 forms the sealing surface of the evacuation valve. It is imperative that the curved sealing surface 94 of the O-ring 90 be smooth and its tangential outer-most surface be substantially parallel to the seal carrier upper surface or top wall 64. However, because the valve seat (not shown) is designed to be centered on the O-ring 90, this allows for variation of the O-ring seal 90 position without compromising the valve seal quality.

The O-ring 90 seal material can be selected from any suitably soft, pliable material such as rubber or a synthetic material. Suitable synthetic materials are sold under the trade names of BUNA, VITON, EPDM, HNBR, CHEMRAZ and KALREZ. However any suitable elastomeric material may be used.

The resulting evacuation valve 50 has many advantages over the prior art design including the following. O-rings have consistent and uniform sealing surfaces. O-rings are readily available and are also available in different materials as recited above. From a serviceability perspective, the O-ring of the present invention can be easily removed and replaced with a new O-ring without the need to replace the holder or carrier. The change is simple as there is no adhesive to remove or re-apply. The improved evacuation valve can be interchanged with existing pump bodies, even pump bodies that are or did utilize a prior art evacuation valve design. In addition, the new O-ring will be properly aligned with the carrier. The improved evacuation valve also allows a tighter tolerance in the valve bore thereby reducing any "side to side" valve play.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention which is defined by the claims.

I claim:

1. An apparatus for metering a liquid medium, said apparatus comprising:
    an evacuation valve for a liquid medium metering device having an O-ring seal and a seal holder, wherein the evacuation valve is in removable communication with a cylinder open end;
    said seal holder comprising a unitary, one-piece construction;
    said seal holder consists of a body having an outer surface;
    said seal holder defining an annular groove formed in said outer surface; and
    said O-ring seal being positioned within said annular groove; wherein said O-ring is biased against said annular groove by said liquid medium when said apparatus is pumping said liquid medium.

2. The apparatus of claim 1, wherein said O-ring seal and said seal holder includes an external portion of said O-ring seal extending axially outwardly of said outer surface of said seal holder.

3. The apparatus of claim 1, wherein said annular groove having an inner diameter being greater than an inner diameter of said O-ring seal.

4. The apparatus of claim 1, wherein said O-ring seal has an outer diameter and said annular groove has an outer diameter; said outer diameter of said annular groove being the same as said outer diameter of said O-ring seal.

5. The apparatus of claim 1, wherein said O-ring seal has a height and said annular groove has a depth, said O-ring seal height being greater than said annular groove depth.

6. The apparatus of claim 1, wherein said seal holder is formed from hexagonal bar stock.

7. The apparatus of claim 6, wherein said hexagonal bar stock has apices, each apex being substantially broken.

* * * * *